United States Patent

[11] 3,604,309

| [72] | Inventor | Charles William Berthiez |
| | | 5 Avenue Sglantine, Lausanne, Switzerland |
| [21] | Appl. No. | 815,065 |
| [22] | Filed | Apr. 10, 1969 |
| [45] | Patented | Sept. 14, 1971 |
| [32] | Priority | Apr. 11, 1968 |
| [33] | | France |
| [31] | | 147,796 |

[54] MACHINE TOOL FOR INTERNAL MACHINING OF A HOLLOW WORKPIECE CONSTITUTED BY TWO HALF SHELLS
12 Claims, 8 Drawing Figs.

| [52] | U.S. Cl. ..................... | 90/15, 90/11 R |
| [51] | Int. Cl. ...................... | B23c 3/02 |
| [50] | Field of Search............ | 90/11, 15, 12, 64, 14; 77/1, 3; 51/170, 174, 180 |

[56] References Cited
UNITED STATES PATENTS

| 3,131,584 | 5/1964 | McFerren..................... | 77/3 |
| 3,469,474 | 9/1969 | Wagner......................... | 77/3 |
| 3,482,474 | 12/1969 | Galbarini et al. ............. | 77/3 |

FOREIGN PATENTS

| 257,202 | 3/1913 | Germany..................... | 90/164 |

*Primary Examiner*—Gil Weidenfeld
*Attorney*—Ward, McElhannon, Brooks & Fitzpatrick ABSTRACT: A machine tool for internal machining of a hollow workpiece of large dimensions constituted by two half shells which are to be assembled along joining planes. The machine tool has support means for the two half shells to support the half shells opposite one another at a distance and a movable member and means to move said member between the two half shells in a direction parallel to the joining planes of the half shells. A machining head is mounted on the movable member and machining means are mounted on the machining head.

3,604,309

MACHINE TOOL FOR INTERNAL MACHINING OF A HOLLOW WORKPIECE CONSTITUTED BY TWO HALF SHELLS

BACKGROUND OF THE INVENTION

The present invention concerns internal machining of hollow workpieces, specifically, of workpieces of very large dimensions, such as housings of large steam turbines utilized for generation of electricity.

This type of workpiece is generally formed of two half shells which are machined in such a manner that after assembly of the half shells along their joining planes they correspond exactly to each other, as if the hollow internal portion had been formed in a single block of metal.

Thus, the housings for steam turbines of large dimensions are constituted by two half shells, one lower and the the other upper, joined along a horizontal plane and presenting, after assembly, an internal surface of revolution about a horizontal axis, which has circular grooves. In these grooves will be mounted the bearing rings of external blades of the turbine stator. At each end of the housing, a bore of smaller diameter than that of the grooves receives a bearing in which is mounted the rotor of the turbine.

The machining, specifically, the internal boring of such hollow workpieces, raises several difficulties due to the considerable size and weight of the workpiece. The workpiece may be deformed by its own weight and these deformations depend on the position of the workpiece. The precision of machining should be very high in order to obtain a good correspondence of the two half shells. Moreover, the bores to be machined in the workpiece have very different diameters.

A method currently used comprises assembling the two half shells in the same position as in the future working position of the workpiece; thus the deformations of the workpiece in this machining position are the same as in the working position and a good correspondence of the grooves formed in the two half shells is obtained. However, the advantages in precision obtained by this method are more apparent than real since the portion of reduced diameter at the ends of the hollow workpiece which is assembled necessitates utilizing boring bars of limited diameter which are not sufficiently rigid to drive tools of large dimensions which are necessary for the machining of the medial portions of the workpiece. Accordingly there are flexions on these bars which are impossible to adjust for with the consequence of concentric errors in the central grooves with respect to the end grooves.

Moreover, when it is desired to change the plates or boring supports on the bar, the two half shells must be separated in order to mount new plates on the machining head. Repositioning the half shells causes delays and is harmful to the precision of machining. Finally, control of the machining tolerances of the diameters and the profiles of grooves necessitates the frequent separation of the two half shells which is harmful to efficiency and productivity.

For these reasons, the internal machining of each half shell of hollow workpieces is sometimes effected separately with the mounting of each half shell for the machining depending on the machine utilized. With milling-boring machines having one upright, the joining plane of the half shell being machined is vertical. It is also known to reverse the half shell above a machining pit in which is mounted a movable member which operates on the half shell from below.

The control of the machining may then be correctly performed as well as changes of the tool or the plate whatever the diameter. However, in both of the above methods, the machining of the two half shells is generally performed in different positions from their working position when assembled to form a hollow housing and each of these methods requires great attention to minute tolerances in order to avoid shifting of the corresponding parts of the two separately machined half shells.

The present invention has for an object the elimination of the above-noted disadvantages and proposes a new method for internal machining of a hollow workpiece constituted by two half shells which enables obtaining high precision in machining and assembling with high speed of performance. The technique may also avoid during machining the effect of abnormal elastic deformations with regard to the final working position of the workpiece.

The present invention has for an object a machine tool for the internal machining of a hollow workpiece of large dimensions constituted by two half shells which are to be assembled along joining planes planes including support means for the two half shells to support the half shells opposite one another at a distance, a movable member, means to move said member between the two half shells in a direction parallel to the joining planes of the half shells, at least one machining head mounted on said member and machining means mounted on said machining head.

A further object of the present invention is to provide support means adapted to support each half shell at the same places and the same positions as in the installation to which the hollow workpiece will ultimately be installed.

It is further object of the present invention to have a movable member formed as a horizontal traverse, movable on horizontal track means located between means supporting the lower half shell on its external part and means supporting the upper half shell along its joining plane.

In accordance with the above, the advantage of positioning the two half shells separated, but facing one another, offers the possibility of easily proceeding with the machining of the two half shells without touching their fixed position on their supports. It is possible to take advantage of their facing position to execute in the two half shells two corresponding profiles without changing the position, along the axis of displacement of the movable member carrying the machining head, before passing to the following profile. Thus, for the execution of profiles of revolution such as grooves, it is possible to machine by circular boring or milling the half groove of a half shell, then the half groove corresponding in the other half shell before advancing to the following groove. It is also possible with the aid of an appropriate machining head to simultaneously machine the two half grooves. Such a manner of proceeding ensures an excellent correspondence of the elements of profile corresponding at the moment of assembling the two half shells along their joining planes.

Due to the separation of the half shells, it is possible, not only to utilize a machine tool as rigid as desired, but to execute vary large diameters despite significant differences between the diameters of the different bores. It is also possible to achieve high tolerances in the positioning of the tools, and of the perpendicularity of the boring plates to the axis of advancement of the movable body carrying the head, and thereby the quality of the surfaces machined. The machine tool according to the invention can be equipped with appropriate optical control and adjustment means. Another advantage of the invention is the possibility of placing the half shells in the position that they will occupy when assembled to form the hollow housing by supporting them at the same places as in the final assembly. This eliminates the unwanted deformations of the half shells under their own weight, that is, other deformations than those which will arise naturally in their final mounting position. Thus, for the housings of large steam turbines, the two half shells are positioned one above the other, the lower half shell being supported by supports at the places which will be used in the final assembly and the upper half shell rests on its edges along its joining plane. There is realized the optimal conditions for internal boring of such housings with high precision and high efficiency.

These and other objects, advantages and characterizing features of the invention will become readily evident upon considering the following description taken in conjunction with the accompanying drawings.

Description

Figure 1:
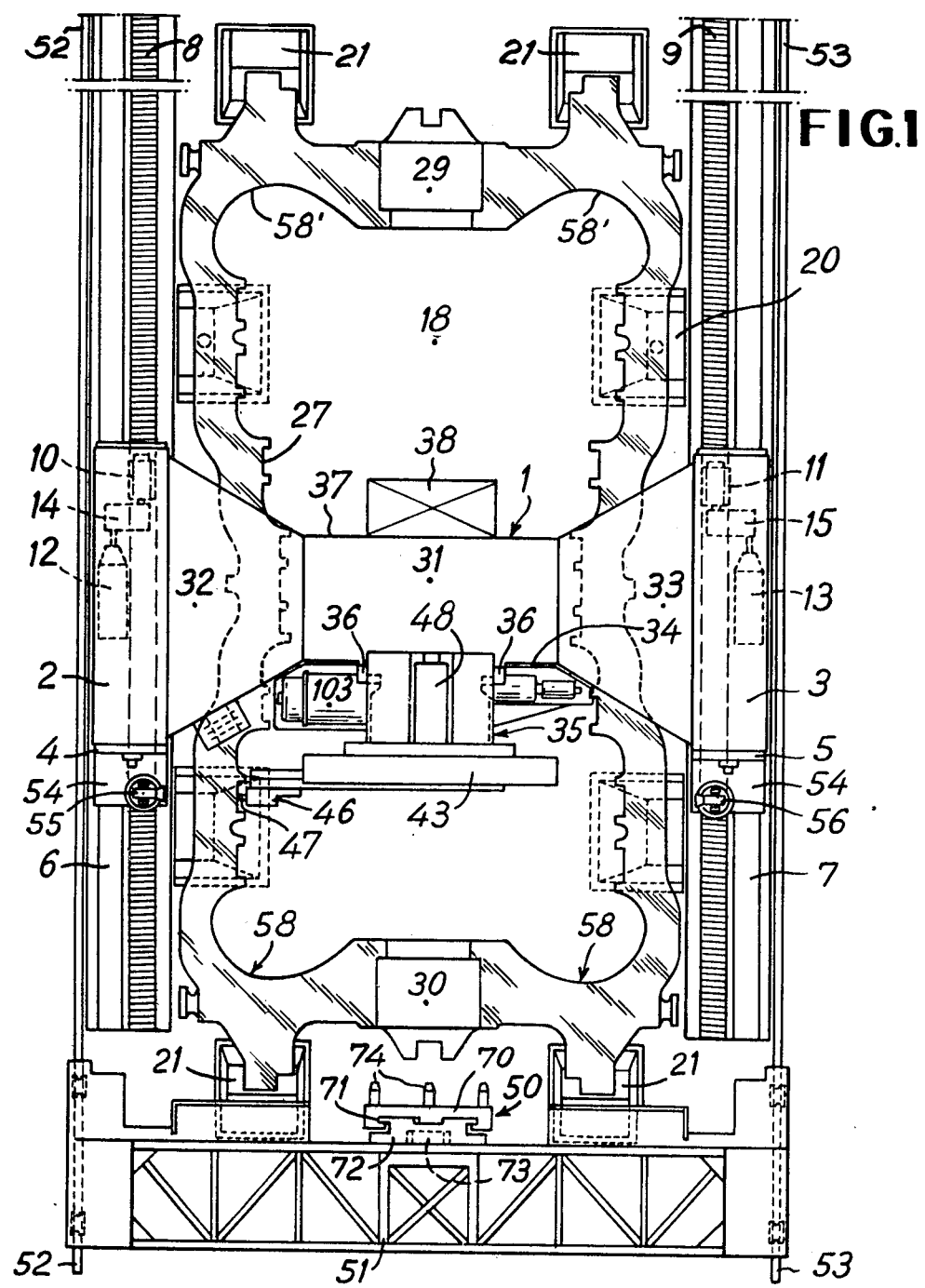
FIG. 1 is a top plan view of a machine tool according to the invention showing the lower half shell of the housing of a steam turbine.
Figure 2:
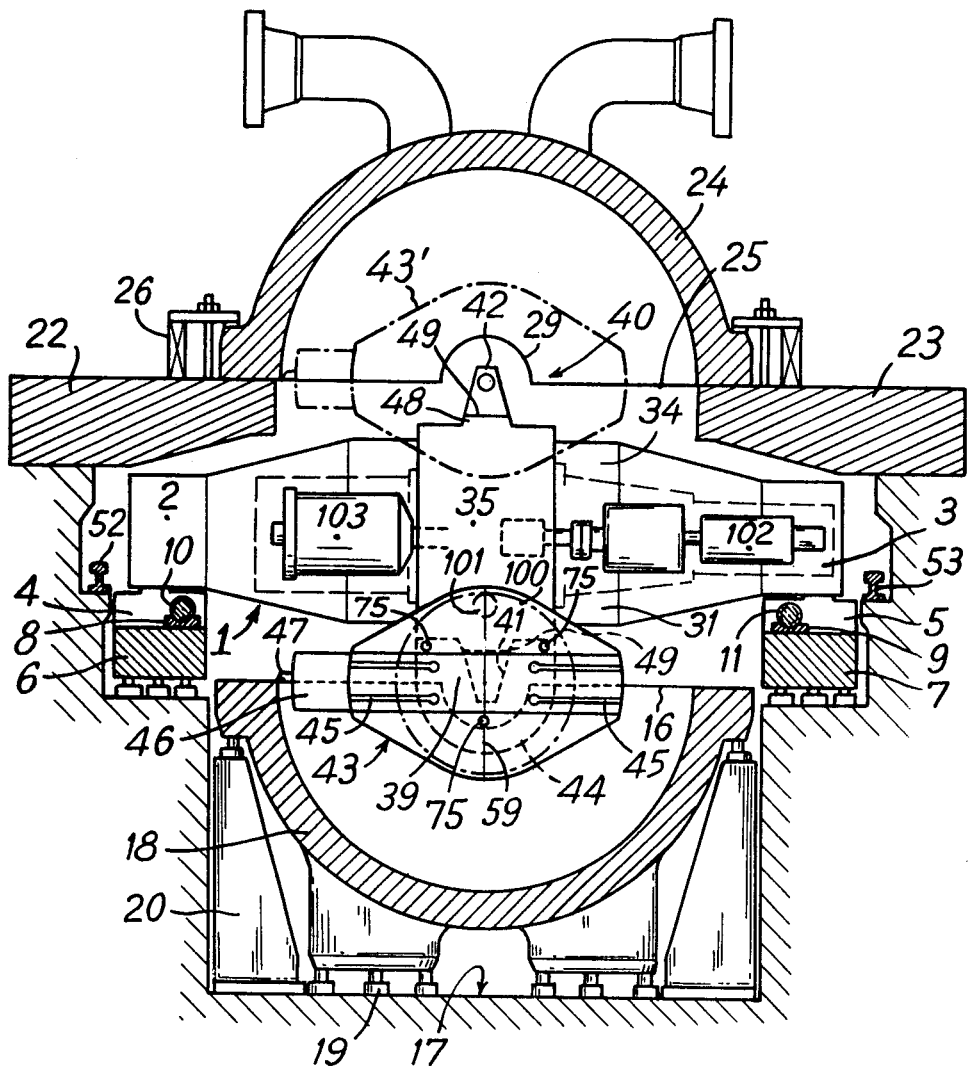
FIG. 2 is a cross-sectional view of the machine tool corresponding to FIG. 1 in which the upper and lower half shells are shown in the course of machining; the view is taken along a vertical plane in front of a traverse carrying the machining head.

FIGS. 1 and 2 show a machine tool according to the invention in which are mounted two half shells of a housing of a steam turbine. It is composed essentially of a movable member including a horizontal traverse 1, very rigid, whose two ends 2 and 3 are supported on a pair of movable chariots 4, 5, respectively, on two horizontal longitudinal track means 6, 7. The pair of tracks 6, 7 are provided with racks 8,9, in order that the chariots 4, 5 may be moved by two worm screws 10, 11. The screws 10. 11 are driven in rotation by a pair of direct current motors 12, 13 with a pair of speed changes 14, 15, enabling a range of desired speeds to be obtained for both rapid advance movements as well as work advance movements.

The pair of motors 12, 13, are synchronized by a well-known electric transmitter-receiver system (not shown) in such a manner as to assure identical advances of the chariots 4, 5, on their respective tracks 6, 7. There is obtained thereby a perfectly controlled displacement of the two ends 2, 3, of the traverse 1 which is maintained exactly perpendicular to its axis of movement. The chariots 4 and 5 may of course be locked in a selected position on their tracks 6, 7, by known means (not shown).

The track means 6, 7, are positioned on either side of a work pit 17 in which is mounted the lower half shell 18 of the housing of a steam turbine. The half shell 18, whose joining plane 16 is horizontal, is supported by supports 19, 20, at its lower portion and by supports 21 at its ends. These supports are placed at the same places and the same positions as in the installation to which the half shell when assembled as a steam turbine housing will be installed.

Above the track means 6, 7 and the ends 2, 3 of the traverse 1 are a pair of retractable floors 22, 23 supporting the edges of a upper half shell 24, which corresponds to the edges of the half shell 18. The upper half shell 24 is thus supported along its horizontal joining plane 25. The floors 22, 23 are provided with locking members to maintain the upper half shell 24 in position. The two half shells 18, 24 are thus disposed opposite one another and their horizontal joining planes 16, 25 are at a sufficient distance from each other to enable the traverse 1 to move without hindrance between the two half shells.

As is clearly seen on FIG. 2, the internal surface of the housing is a surface of revolution around an axis parallel to the direction of displacement of the traverse 1 on the tracks 6, 7 and is composed of a series of bores of different diameters, particularly, of grooves such as 27, FIG. 1, provided to receive the bearing rings of the turbine stator blades.

At the two ends, the housing of the turbine has bores 29, 30 for the rotor bearings. The bores 29, 30 are of relatively small diameter in comparison with the grooves 27.

The traverse 1, which is very rigid, due to the nature of its construction, is mounted so as to be isostatic, that is, in such a manner as to not cause secondary efforts by flexion, or by sagging of the supports of the ends 2, 3. The traverse 1 comprises a central carrier 31, FIG. 1, connected to the ends 2, 3 by a pair of wings 32, 33 which, seen from above, increase in length towards the chariots 4, 5 so as to prevent the tipping of the traverse 1 under the influence of an offcenter load on the central carrier 31.

The central carrier 31 is provided on one of its vertical faces 34 with a single-maching head 35, movable vertically on slides 36 of the carrier 31 and whose weight is compensated by a hydraulic system of a known type (not shown). On the opposite vertical face 37 of the central carrier 31 is provided a counterweight 38 to balance the weight of the head 35.

The machining head 35 has a lower and upper face 39, 40 provided with two trapezoidal points 41, 42 respectively, in the same vertical plane. The two end faces 39, 40 are, moreover, supplied with means to center a plate 43 thereon in such a manner that the cutting edges of tools 47 of a given plate be exactly in the same plane on whichever face 39 or 40 is mounted the plate. The plate 43 is in FIG. 2 a boring plate which is interchangeable on the head 35.

Moreover, the centering means, which will be disclosed in further detail below, are such that the axes of rotation of the plates 43 are perfectly horizontal. As shown on FIG. 2, the position of the plate 43 fixed on the end face 40 is shown in dashed lines 43′, the height of the head 35 is such that the axis of the plate 43 is found either in the joining plane 16 of the half shell 18 or in the joining plane 25 of the half shell 24, depending on whether it is fixed on the lower end face 39 or on the upper end face 40, without any movements of the head 35 necessary.

The boring plate 43, FIG. 2 is supplied with two sets of sliders 45 diametrically opposed in which may be radially moved a chariot 46, which holds a machining tool 47. The plate 43 is mounted on a support 44 whose outlined contours may be seen in FIG. 2 and which is clearly shown on FIGS. 6 and 7. The support 44 is positioned on the face 39 of the head 35 by a prismatic projection 48 and a corresponding detent 49 in the support 44. The plate 43 has, on the side of the head 35, a toothed crown 100 driven by a motor 103. The motor 103 is mounted in the head and drives the crown 100 through a gear 101. When no plate is mounted on the head 35, it is to be noted that the traverse 1 is capable of free movement on the tracks 6, 7 without any hindrance from the half shells. Particularly, the trapezoidal points 41, 42 of the end faces 39, 40 of the head 35 may freely pass at the level of the half bores corresponding to the bearings 29, 30.

The principal of machining of the housing of a steam turbine by means of a machine tool which has been described with reference to FIGS. 1 and 2 is relatively simple. The traverse 1 being placed directly facing a bore to be executed there is mounted on the end face 39 of the head 35 a plate 43, and there is performed a half bore of the lower half shell 18 to the desired diameter, in one or several passes of determined depth by the advancement of the chariot tool carrier 46. Then, maintaining the same position of the traverse 1, there is performed the half bore which corresponds on the upper half shell 24. Having finished a complete bore, it is then possible to pass to the machining of the following position by a suitable advance of the traverse 1.

It is possible to perform the two half bores simultaneously in certain situations. The operation is performed by positioning two vertically movable, independent half heads on the head 35, as will be disclosed below. In the case of a cylindrical profile of some length, the cylindrical profile is machined in each half shell by advancing the traverse 1.

The machine tool shown in FIGS. 1 and 2 is capable of machining very large diameters such as the grooves 27, in the interior of the turbine housing, and is also capable of machining smaller diameters as bearing positions 29, 30 at its ends. The head 35 may be supplied to this end with boring plates of different diameters as needed. When the boring plates are of very large dimensions, as in the case of the plate 43, FIGS. 1 and 2, a pair of plates simultaneously mounted on the end faces 39, 40 of the head 35, endangers harmful interference. This is the reason that the half shell 18 is machined with the plate 43, then the plate 43 is raised to position it on the opposite end face in the position 43′, to machine the upper half shell 24. If the plates are of smaller dimensions and thus do not risk interfering with each other, it is then possible to simultaneously mount two plates on the head 35, FIG. 3.

Figure 5:
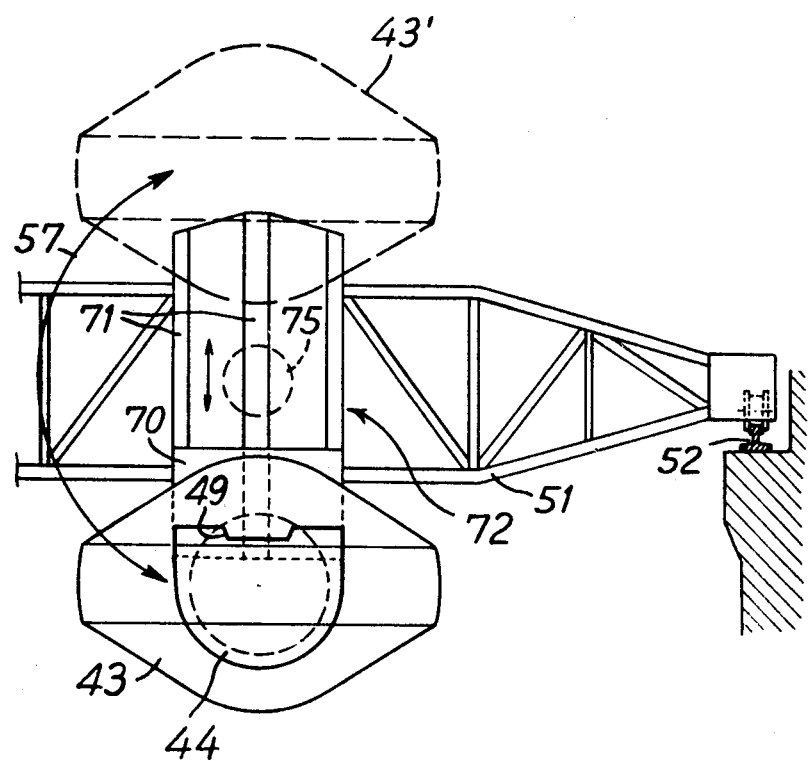
FIG. 5 is a schematic partial view of a manipulator partially shown in FIG. 1 from the rear, illustrating the exchanging of the machining plates.

Changing the plate, or changing the position of the plate between the end faces of the head 35 is performed with the aid of a manipulator 50 mounted on a traverse 51, FIG. 5, movable on two parallel rails 52, 53 positioned above the track means 6, 7. The manipulator will be described in detail below. Preferably, there is provided on the traverse 51 a bridge capable of serving as a command platform for the machine and on which are collected all the control posts for this purpose. Moreover, this bridge enables access to the machining plate and enables changing the tools or modifying the position.

In order to control the position of the tools, the precision and the quality of work move on the track means 6, 7 on the same side as the head 35 with respect to the traverse 1. The small chariots 54 are attached to and driven by the traverse 1. The small chariots 54 are attached to and driven by the traverse 1 in its movements. However, they are not supported by the traverse 1 so as not to be subject to sagging of the traverse 1 under the effect of different loads. The orientation remains, consequently, as constant as possible with respect to the half shells being machined. On the chariots 54 are mounted two collimator sights 55, 56 facing one another. The two sights are pivotal in a vertical plane perpendicularly to the tracks 6, 7 around an axis parallel to the axis of the turbine. The two sights enable to verify for the series of tools mounted on the boring plate 43 that they are in a rigorously vertical plane. This control may be performed for the tools of a single plate and for those of two plates mounted together on the end faces 39, 40 of the head 35.

Such a control is essential for maintaining within the required tolerances the machining of the corresponding parts of the two half shells. The sights 55, 56, may also be utilized for verifying that the two corresponding half grooves are in the same plane.

As has already been stated, the machine tool may machine very large diameters as, for example, the end lobe 58 of the turbine housing, FIG. 1, with the aid of plates such as the plate 43 having an extended form in the direction of the slides 45, without being hindered by the bore 30 at the ends of the housing. The distance separating the two half shells 18, 24 is sufficient for enabling the small axis 59 of the plate 43 carried by the manipulator 50 to pass between the joining planes 16, 25 without difficulties.

Examination of FIG. 1 shows however, that it is difficult to machine with the aid of a single head 35 certain retracted portions such as the lobe 58′ opposite to the head 35 with respect to the traverse 1.

Effectively, it would be necessary to provide a significant cantilever of the head 35 with respect to the carrier 31 of the traverse 1 in order to enable the boring tools to reach the considerably retracted parts, without contracting the traverse 1. There is thus provided for the execution of this type of machining a second head similar to the head 35 in the position of the counterweight 38. This embodiment will be described below and illustrated by FIG. 4.

Figure 3:
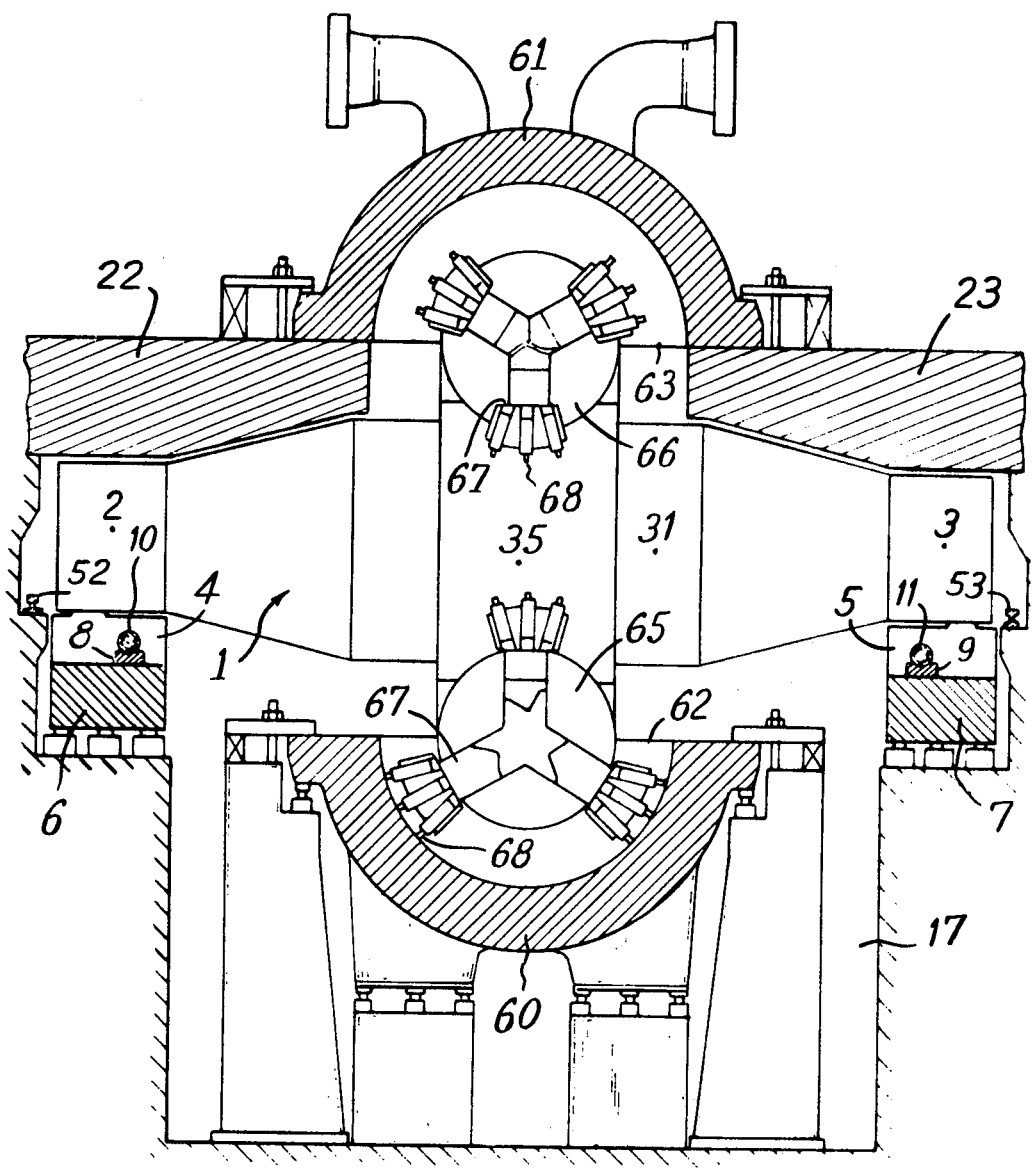
FIG. 3 is a view similar to that of FIG. 2, i illustrating the machining of a housing of smaller dimensions.

The different features mentioned above are illustrated in detail in FIGS. 3 to 8. On FIG. 3 there is seen the same machine tool as that of FIGS. 1 and 2, in which are mounted two half shells 60, 61 of a steam turbine housing of smaller dimensions than the half shells 18, 24. The joining planes 62, 63 of the two half shells 60, 61 are separated the same distance as the joining planes 16, 25 of the half shells 18, 24, FIG. 2. On the head 35 are mounted jointly two boring plates 65, 66, each having three chariots 67, carrying tools 68, disposed at 120° and movable radially. In the embodiment of FIG. 3 only the boring plate 65 is machining the plate 66 being disengaged and fixed in a rest position, its three tool carrying chariots 67 being retracted.

It has been seen that the machining of the half shells requires the use of plates of different diameters, and in the case of plates of very large dimensions, the passage of the same plate, from the machining position on the lower half shell to the machining position on the lower half shell to the machining position on the upper half shell. The bearing positions 29, 30 of reduced diameter do not allow the movement of the plates towards the ends of the housing being machined by a simple translation of the traverse 1 to the end of the track means 6, 7 in order to perform there the changing operations of an exchange of plates. Thus, in order to change the plate, it is necessary to move it first into the space separating the two joining planes of the half shells being machined, in order to then move it parallel to the track means 6, 7 as disclosed below.

These operations are performed by the plate manipulator 50 mounted on the traverse 51 which is movable on the pair of rails 52, 53 parallel to the traverse 1. The manipulator 50, FIGS. 1 and 5, includes a slidable chariot 70 which moves in guideways in a faceplate 72, itself rotatably mounted about a horizontal axis on the traverse 51 by a roller bearing race 73. On its opposite face the chariot 70 has support members for the machining plates such as three projections, 74, capable of engaging the slots 75 in the plate 43, FIG. 2.

In order to remove the plate 43, the operation of the manipulator is as follows:

The traverse 51 is positioned opposite the plate 43; the chariot 70 is moved on its guideways 71 in order to position the projections 74 in the corresponding slots 75 of the plate. The plate is fixed in position on these projections, while the support 44 is detached from the end face 39; the traverse 51 is then retracted in such a manner as to remove the support 44 and the plate 43 from the head 35; then by sliding the chariot 70 on the face plate 72, the plate 43 and the support 44 are moved in the space separating the joining planes of the two half shells being machined and by retracting the traverse 51 the plate 43 is moved outside the work zone.

The maneuver to move the plate 43 to the position 43′, FIG. 2 and 5, requires the manipulator manipulator to engage the plate 43 and to remove the plate 43 and its support 44 from the end face 39 of the head 35. Then, without touching the chariot 70, the faceplate 72 is turned on its bearing 73 through 180° is indicated by the arrow 57. This moves the trapezoidal detent 49 opposite the prismatic projection 48 of the upper end face 40. It is only necessary then, to connect the plate 43 and its support 44 to the face 40 and to lock it in this position, before moving the manipulator 50 back to its position at the end of the work zone.

Figure 4:
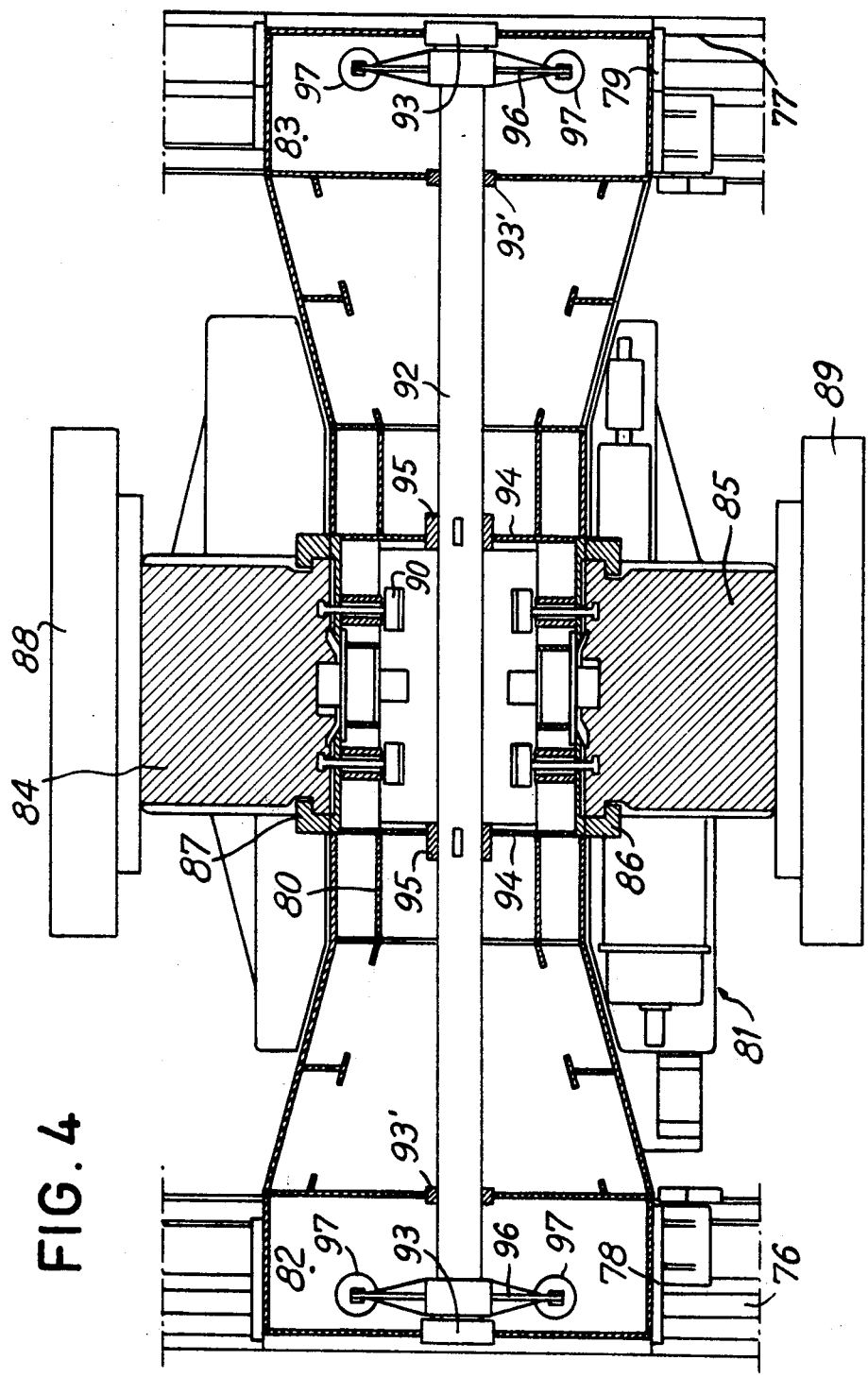
FIG. 4 is a plan view of a traverse having two opposed machining heads.

FIG. 4 is a plan view of a traverse 81 similar to the traverse 1, FIG. 1, taken along the horizontal plane of symmetry. There can be seen the tracks 76, 77 on which move the chariots 78, 79 respectively, supporting the ends 82, 83 of the traverse 81. The distinction over the traverse 1 of the traverse 81 is its having two opposed identical machining heads 84, 85, identical to the head 35 of the traverse 1. These heads are both movable vertically the length of guideways 86, 87 mounted on the vertical opposite walls of the central carrier 80 of the traverse 81. The two heads 84, 85 are supplied on their lower faces with machining plates 88, 89, identical to the plate 43 or to the plates 65, 66, FIG. 3. Clearly seen on FIG. 4 are locking means 90 for the head 84 in position on the guideway 87.

The traverse 81 includes a transverse 81 includes a transversal tubular torsion bar 92 capable of pivoting in end bearings 93, 93′ and rigidly positioned at its central portion by keys 95 to a pair of diaphragms 94 which are a part of the construction of the central carrier 80. Between the bearings 93, 93′, each end of the bar 92 is attached to a balance means 96, whose ends are positioned in a pair of hydraulic cylinders 97. It is thus possible, by adjusting the pressure in the cylinders 97, to pivot the bar 92 in such a manner as to communicate a torsional force to the central carrier 80, through the intermediary of the keys 95 and the diaphragms 94.

Due to the two heads 84, 85 the traverse 81 is able to perform selected machining of retracted portions which are impossible to perform with a single head as indicated above. However, for other machining, it is not possible to keep the two plates 88, 89 mounted on their respective heads, due to the particular forms of the workpieces to machine, for example, when one of them comes into stopping contact at an end of the housing. It is then necessary to remove the plate or plates of a head in order to enable the other to work, which produces an unbalancing of the traverse 81, tending to cause it to bend or tip to the side of the head having the plates. This causes a tipping of the position of the axis of rotation of the plates, which is corrected by adjusting the oil pressure in the cylinders 97, in such a manner as to give the bar 92 a compensating torsion to the force creating the unbalance on the central carrier 80. Due to the optical control of the position of the plate, it is possible to ensure and verify this correction with high precision.

It is to be understood when there is utilized a traverse similar to that of FIG. 4 equipped with two symmetric heads 84, 84 it is preferred to provide optical sights for control analogous to the sights 55, 56 paired on each side of the traverse 81, as well as a second manipulator identical to that of FIG. 1.

Figure 6:
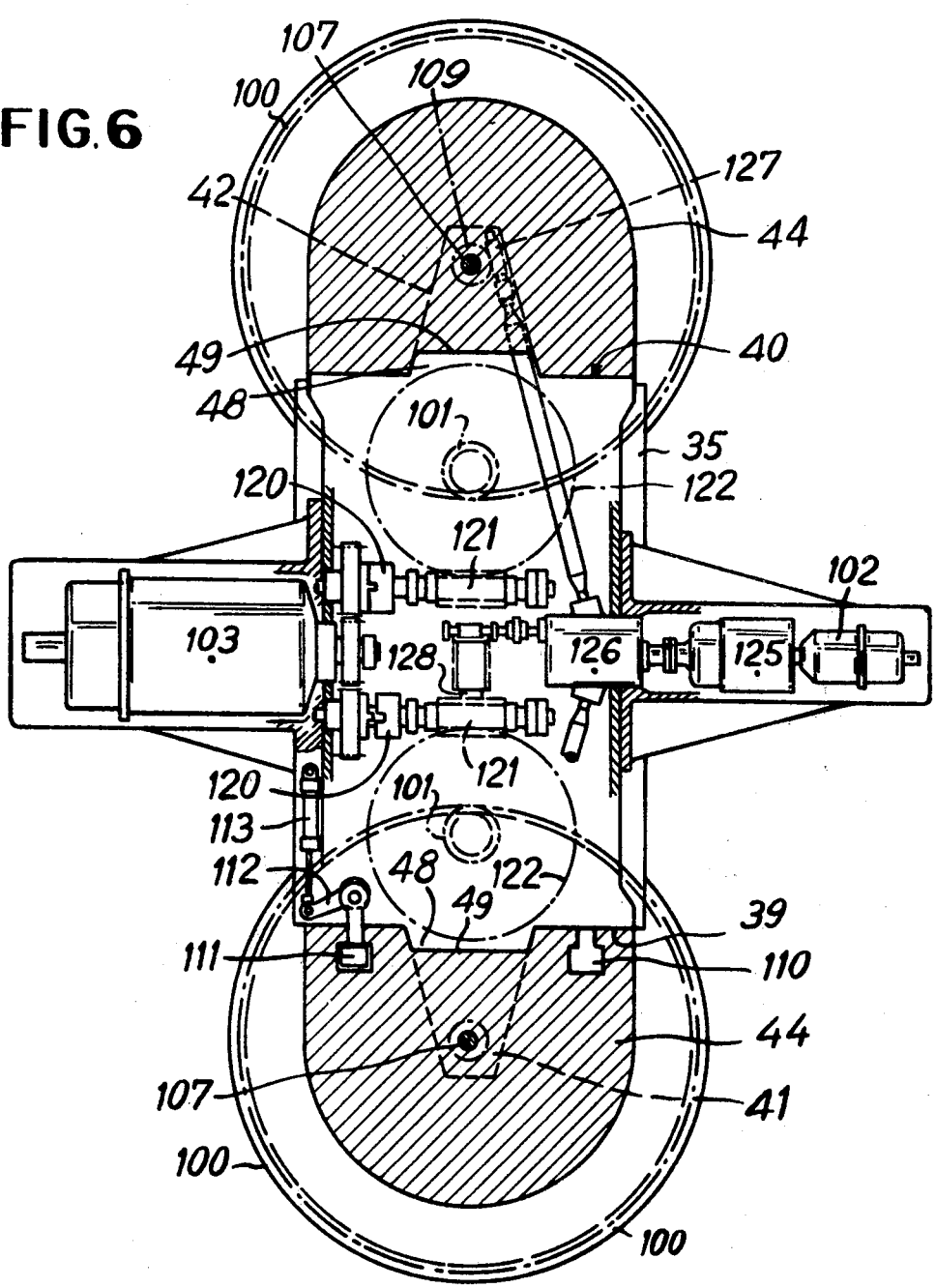
FIG. 6 is a schematic front view of the machining head carried by the traverse showing g its principal features.
Figure 7:
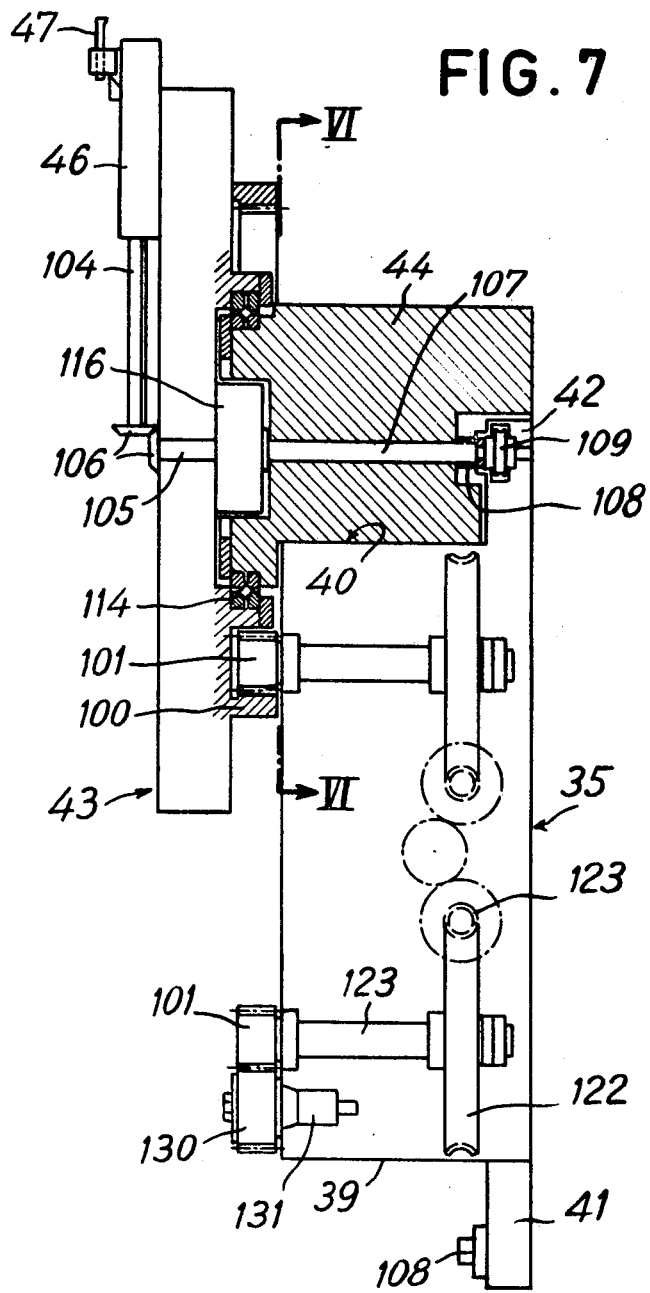
FIG. 7 is a right cross-sectional view of the machining head of FIG. 6 equipped with a boring plate for the upper half shell taken along the vertical plane of symmetry.

FIGS. 6 and 7 schematically illustrate a system for mounting the plates 43 with the support 44 on the machining head 35, similar to that of FIGS. 1 and 2, and the driving system from the machining head 35.

FIG. 6 shows two identical opposed supports 44, mounted on the head 35. The cross-sectional view is taken along the line VI—VI, FIG. 7. The end faces 39, 40 of the head 35 with their trapezoidal projections 41, 42 and prismatic positioning projections 48 are engaged in the corresponding detents 49 of the supports 44. As shown on the lower end face 39, the support 44 is equipped with longitudinal T-shaped grooves in which are positioned fixing members 111, attached to the head 35 and hydraulically moved by a link 112 and a jack 113.

The plate 43 is centered on the support 44, FIG. 7, by a crossed roller bearing 114 and receives its rotative movement from the gear 101 driving the toothed crown 100 on its internal face. On the front face of the plate 43, the chariot tool carrier 46 is driven by a screw 104 connected to a shaft 105 in the axis of the plate 43 by the intermediary of a conical gear train 106. The shaft 105 is placed at the output of a differential 116. The input of the differential is driven by a shaft 107 passing through the support 44. The shaft 107 is engaged in a connecting member 108 driven by a gear 109 housed in the machining head 35. Each end face 39, 40 of head 35 includes a gear 101 and connecting member 108. When mounting the plate 43 and the support 44 on one of the end faces 39, 40 of the head 35, centering is automatically performed by the prismatic projections 48 and the corresponding detent 49. The toothed crown 100 engages the gear 101 and the input shaft 107 of the differential engages the connecting member 108 in order to control the advances of the tool carrying chariot 46.

The machining head 35 has two electric motors 102, 103. The motor 103 rotatably drives the boring plates such as 43, through the intermediary of a pair of identical independent gearings driving the gears 101 associated with the end faces 39, 40. These gearings include a clutch 120 coupled to a worm screw 121. The worm screw 121 rotatably drives a gear 122 at the end of the shaft 123 to which is mounted the gear 101. In FIG. 6, the clutch 120 for the upper plate is engaged while the clutch 120 for the lower plate is disengaged.

The motor 102 is connected to a speed reducer 125 which drives through a transmission 126, on the one hand, the two gears 109 for controlling the advance of the chariots 46 by a worm screw 127 and, on the other hand, a screw for controlling vertical movements of the head 35 by means of a small track 128. At the lower portion of FIG. 7 is shown a second detachable gear 130, turning freely on a shaft 131 mounted in a cylindrical housing of the head 35 and driven by the gear 101. The gear 130 enables driving rotatably a plate of reduced diameter from tat of the plate 43, having an exterior crown attached thereto. If there is used a second gear similar to the gear 130, but of a different diameter, it becomes possible to drive four types of boring plates:

two large plates provided with driving crowns such as 100, toothed respectively on their external and internal faces may be driven by the gear 101; two small plates carrying externally toothed crowns driven by gears such as 130.

Figure 8:
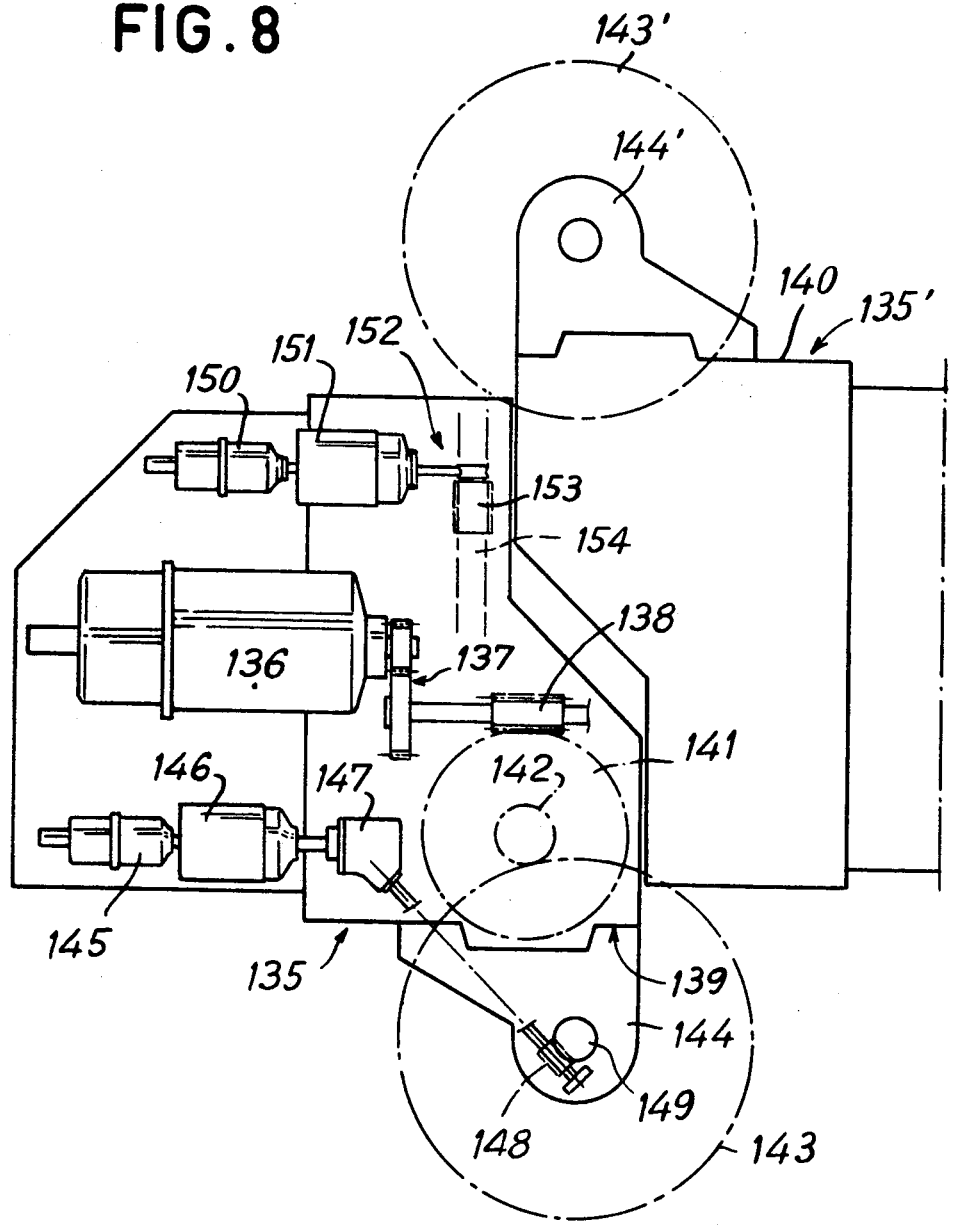
FIG. 8 is a schematic elevational view of an alternative embodiment of circular machining head including two independent, vertically movable half heads.

FIG. 8 illustrates an alternative embodiment of a machining head carried by a traverse such as 1 or 81 including two half heads 135, 135'. This traverse may be supplied with one or two heads of this type. The half head 135 has an end face 139 capable of receiving a support 144 of a lower boring plate 143, schematically shown by the dotted lines of its toothed driving crown. The half head 135' includes an end face 140 capable of receiving a second support 144' of an upper plate 143', also shown in dotted lines. The two half heads 135, 135' are vertically movable, independently of each other and fitted with respect to each other in such a manner as to maintain the two axes of the plates 143, 143' precisely in the same vertical plane.

In this example, the lower plate is driven from a motor 136 by a gear train including a gearing 13, a worm screw 138, two gears on the same shaft 141, 142, the gear 142 driving the crown 143. A motor 145 controls through the intermediary of the speed reducer 146 a transmission 147 and a worm screw 148, the rotation of a gear 149 advancing the tool carrying chariots of the plate 143. Finally, a motor 150 drives a speed reducer 151 and a gear train 152 drives a worm screw 153 to provide ascending and descending movements to the half head 135 on a track 154 carried by the vertical face of the traverse supporting the heads. The driving of the several mechanisms of the half head 135' is identical to that which has been described for the half head 135. It is also possible to provide a single motor for each type of control with slide-type transmission to the two half heads.

These two half heads enable executing, in certain situations, simultaneous machining of the corresponding profiles of the two half shells positioned opposite one another, thereby doubling the operating speed of the machine too.

What I claim is:

1. A machine tool for the internal machining of a hollow workpiece of large dimensions and constituted by two half shells which are to be assembled along joining planes which comprises: support means adapted to support said half shells opposite one another in spaced relationship, said support means being further adapted to support each half shell at the same places and in the same position as in the installation to which the workpiece will ultimately be installed;

horizontal track means positioned externally of said half shell and between the joining planes thereof;

a movable member positioned between said half shells and supported on said track means;

drive means mounted on said movable member and arranged to move said member along said track in a direction parallel to the joining planes of said half shells;

at least one machining head mounted on said movable member; and machining means mounted on said machining head.

2. A machine tool as recited in claim 1 wherein said machining means includes at least one rotatable circular machining plate removably mounted on said machining head.

3. A machine tool as recited in claim 2, wherein said machining head includes two opposed connection means located in the same vertical plane to provide support for one machining plate in either of two positions or two machining plates one in each of said two positions for machining of said half shells in the same vertical plane.

4. A machine tool as recited in claim 1 wherein there are two machining heads mounted on said movable member, each of said machining heads being equipped with circular machining plates oppositely disposed with respect to the direction of movement of said movable member.

5. A machine tool as recited in claim 1 including means for moving said machining head in a transverse direction with respect to the joining planes of the two half shells.

6. A machine tool as recited in claim 1 wherein said machining head includes two half heads which are movable transversely with respect to the joining planes of the half shells.

7. A machine tool as recited in claim 1 wherein each of said machining heads has an associated manipulator means, said manipulator means being supported on horizontal rails and being movable parallel to said movable member, chariot means slidably mounted on said manipulator means and being slidable perpendicularly to the joining planes of the two half shells, and said chariot means having means adapted to engage and carry said machining means.

8. A machine tool as recited in claim 1 wherein optical gauge means are provided between the joining planes of the two half shells for aligning said machining means.

9. A machine tool as recited in claim 1 wherein said movable member is a horizontal traverse which is movable on two parallel horizontal track means, said track means being located between means supporting a lower half shell on its external part and means supporting an upper half shell along its joining plane.

10. A machine tool as recited in claim 9, wherein said traverse includes a central carrier, said central carrier including diaphragm means; a torsion bar fixedly mounted on said diaphragm means and extending transversely of said traverse, said torsion bar being controlled at its ends by balance means such as to compensate for torsion due to unbalance of said transverse.

11. A machine tool as recited in claim 10 wherein said balance means includes a pair of hydraulic cylinders adapted to pivot said torsion bar whereby a torsional force may be directed to said central carrier.

12. A machine tool as recited in claim 2 including connection means to secure said circular machining plate on said machining head, said connection means including a trapezoidal support member having bearing means thereon, said plate being mounted on said bearing means, means for rotating said plate including a pinion drivingly engaged with a toothed ring on said plate.